Nov. 1, 1955  G. C. ELLERBECK  2,722,376
BACK TRANSFER CALCULATING MACHINE
Filed July 1, 1952  5 Sheets-Sheet 1
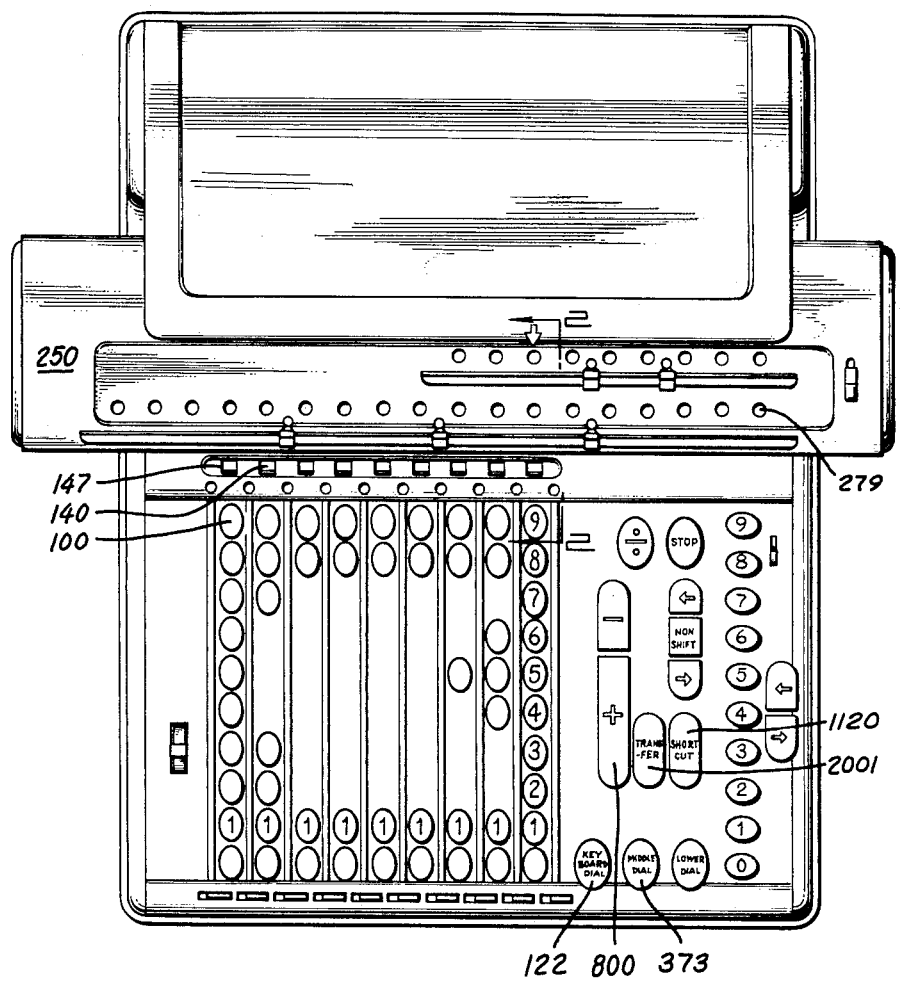
FIG_1
GRANT C. ELLERBECK
INVENTOR.
BY
ATTORNEY Nov. 1, 1955  G. C. ELLERBECK  2,722,376
BACK TRANSFER CALCULATING MACHINE
Filed July 1, 1952  5 Sheets-Sheet 2
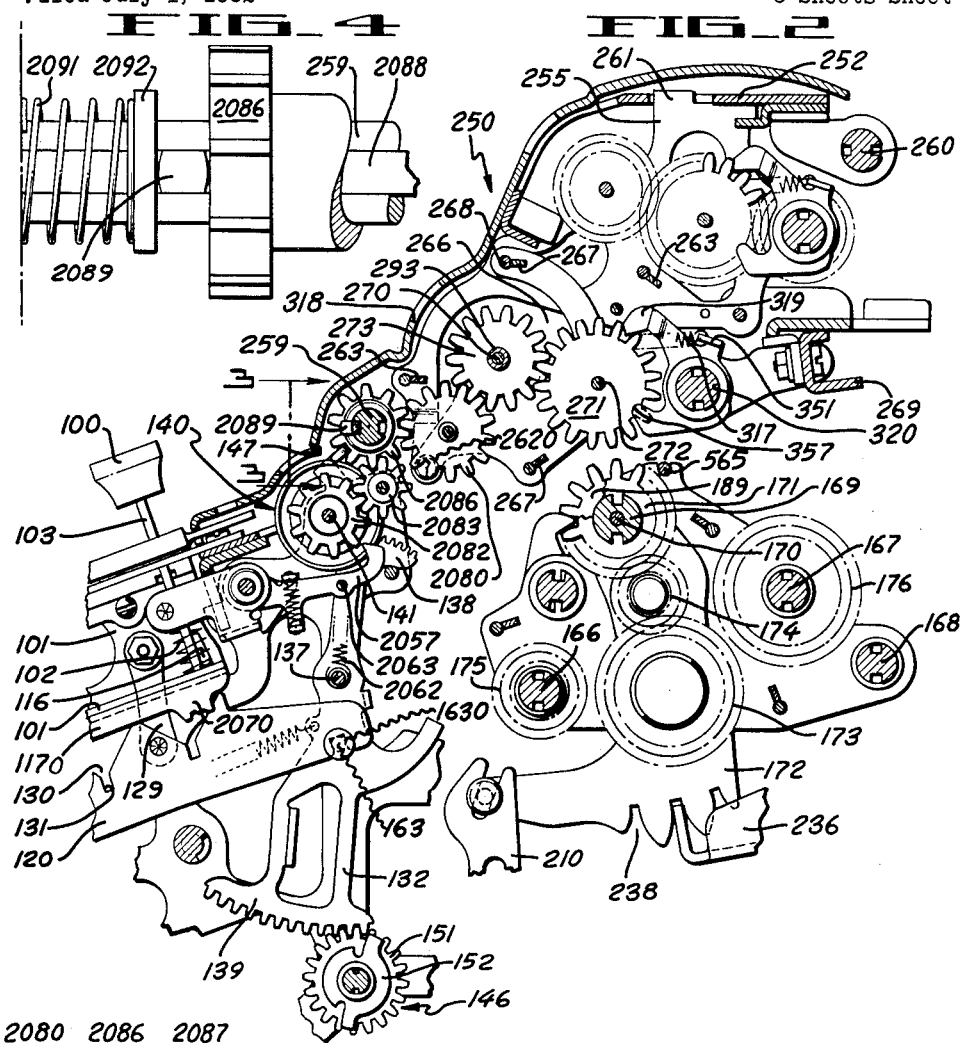
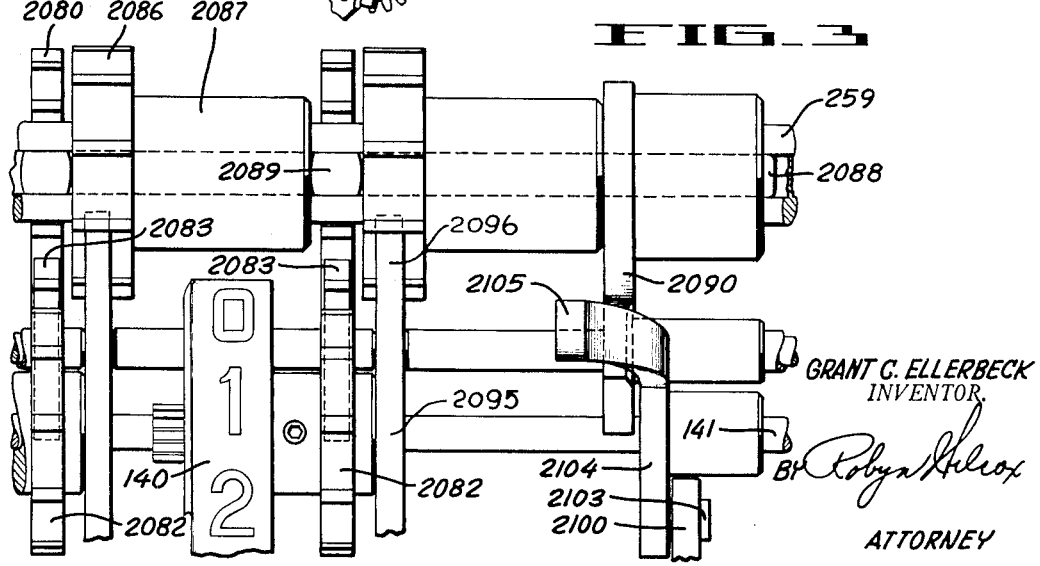
GRANT C. ELLERBECK
INVENTOR.
BY Robyn Hilcox
ATTORNEY

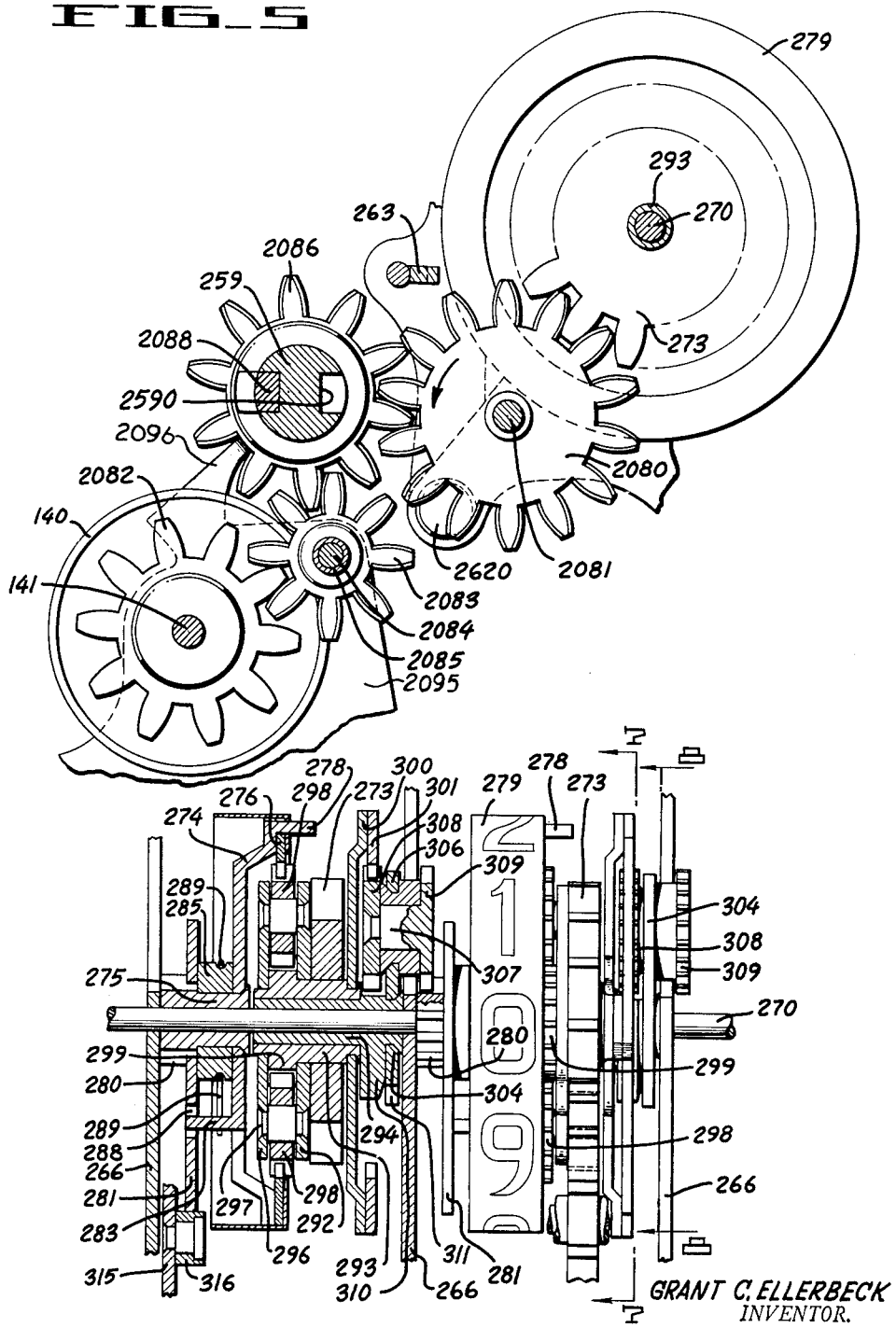

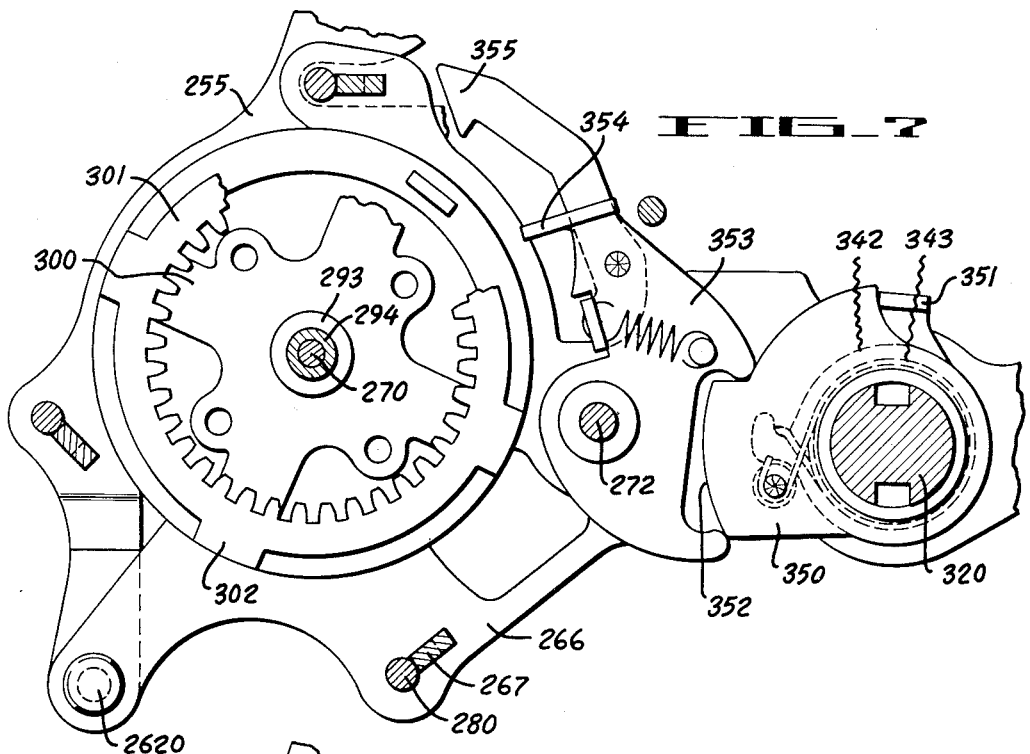
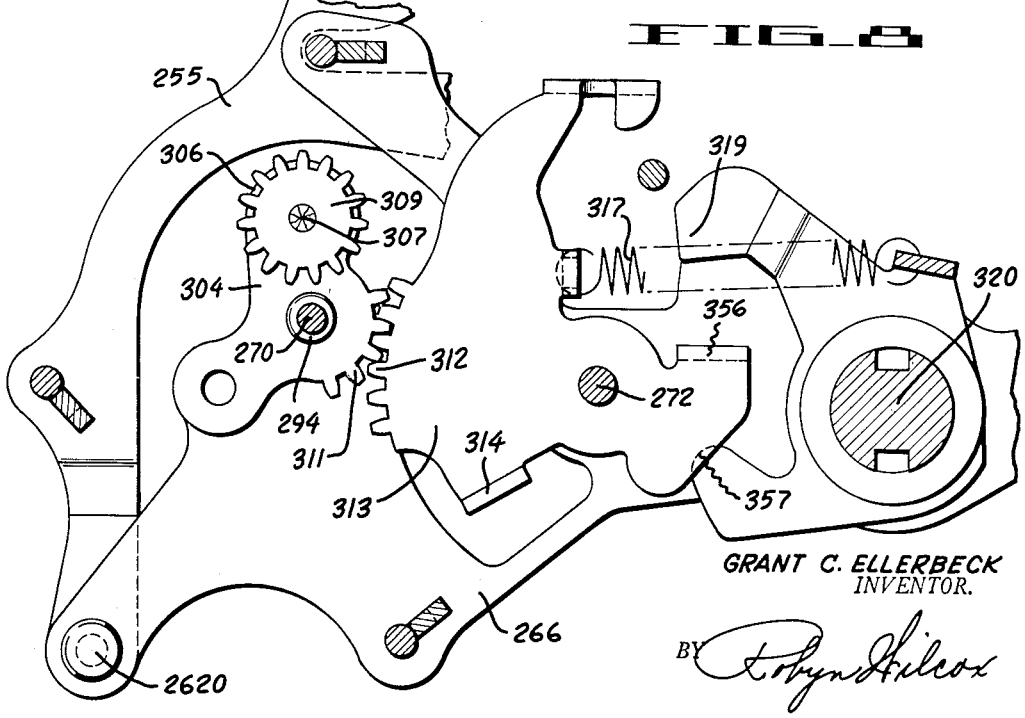

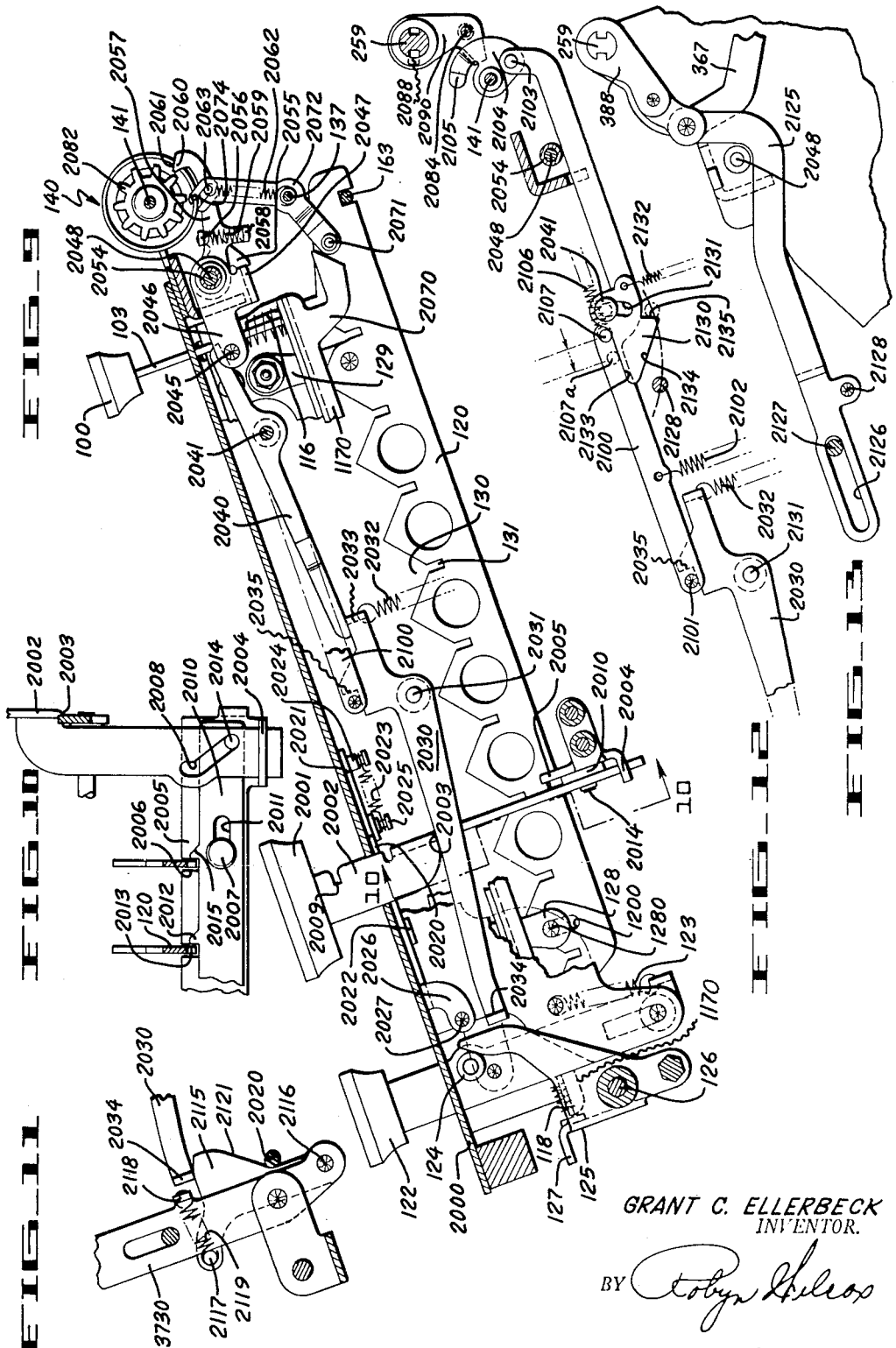

United States Patent Office 2,722,376
Patented Nov. 1, 1955

2,722,376

BACK TRANSFER CALCULATING MACHINE

Grant C. Ellerbeck, San Leandro, Calif., assignor to Friden Calculating Machine Co., Inc., a corporation of California Application July 1, 1952, Serial No. 296,536

11 Claims. (Cl. 235—63)

This invention relates to calculating machines and has as its general object the provision of a mechanism by means of which a value standing in the accumulator of a rotary type calculating machine can be transferred back into the selection mechanism where it can be used as a keyboard factor in a succeeding operation.

An important object of the present invention is to provide a mechanism by means of which an accumulator register utilizing a planetary, or crawl type, tens-transfer, and which is cleared by releasing the register dials from their holding detents so that they may be returned to zero by the force of a torsion spring, can be connected by interponent gearing to the check dial during a clearing of the accumulator, whereby the value standing in the accumulator is transferred into the check dial and thence into the selection mechanism where it is locked as a keyboard factor for the succeeding operation.

Another important object of my invention is to provide a mechanism which is selectively settable to transfer a value standing in the accumulator register into the selection mechanism of the type best shown and described in the patents to Avery, No. 2,211,736 of August 13, 1940; No. 2,216,659 of October 1, 1940; and No. 2,271,240 of January 27, 1942, whereby such a machine can be readily converted into what is commonly known as a "back-transfer" machine, operative in any carriage position.

These and other important objects of my invention will be readily understood from the description and claims which follow.

A further object of the present invention is to provide a means for sensing a zero setting of the keyboard of a calculating machine, and particularly one which blocks operation of a back transfer control key if a value stands in the selection mechanism.

A preferred form of my invention is shown in the accompanying drawings in which:

Fig. 1 is a plan view of a preferred form of my machine, being similar to Figs. 1 of the patents to Avery, Nos. 2,216,659 and 2,271,240.

Fig. 2 is a sectional elevation illustrating the rear part of the keyboard for selecting a value for registration, a portion of the power-set selection mechanism, actuating mechanism, and the accumulator and counter registers associated therewith, and is similar to Figs. 2 of the patents just mentioned with the addition of the interponent gearing for effecting a transfer from the accumulator register into the selection mechanism, such as a view taken along the plane indicated by the lines 2—2 of Fig. 1.

Fig. 3 is a front elevation of the right side of the interponent gearing of my invention, such as taken along the transverse vertical plane indicated by the lines 3—3 of Fig. 2.

Fig. 4 is a partial front elevation of the left end of the mechanism shown in Fig. 3.

Fig. 5 is an enlarged side elevation of the interponent gearing operative to connect the accumulator register and the check dial mechanism.

Fig. 6 is a front elevation partly in sections of two connected dial assemblies of the accumulator register illustrating the manner of construction thereof.

Fig. 7 is a cross-sectional view of a dial assembly taken along the vertical plane indicated by the line 7—7 of Fig. 6.

Fig. 8 is a cross-sectional view of a dial assembly taken along the vertical plane indicated by the line 8—8 of Fig. 6.

Fig. 9 is a side elevation of a preferred form of control mechanism associated with my invention.

Fig. 10 is a partial front elevation of the back-transfer initiating key and a means for sensing the status of the keyboard to determine whether or not a transfer can be effected, such as taken along the planes indicated by the lines 10—10 of Fig. 9.

Fig. 11 is a partial side elevation of the means whereby depression of the transfer key initiates operation of the mechanism clearing the accumulator register.

Fig. 12 is a partial side elevation of the control mechanism showing particularly the means for shifting the interponent gearing into operative position to connect the accumulator register to the check dial register.

Fig. 13 is a detail of a portion of the accumulator clearing mechanism showing particularly means for disabling the control link of Fig. 12 after clearing.

A preferred utilization of my invention is to convert the calculator of the above-mentioned patents into a back-transfer machine, in which a value registered in the accumulator register and standing in the register dials 279 can be transferred into the check dials 140, and thence into the selection mechanism for use as the keyboard factor of the succeeding machine operation. This permits the machine to be used for problems of the nature of $a \times b \times c$ by the manual insertion of the three factors in their proper order into the machine, without it being necessary to manually transfer the product of $a \times b$ into the keyboard with its consequent chance of error.

For purposes of simplification the machine of these patents is not described in detail, as most of the parts of the machine are not concerned with the operation of my invention. In order to render my invention more readily apparent to those familiar with the machine of said patents I have used the same reference characters as used in Patent No. 2,271,240 issued January 27, 1942, when the parts are the same as shown in the patent. However, when the parts have been slightly modified this fact is shown by adding another digit to the reference character used in the patent, e. g., the ordinal keyboard latch 117 of the patent is changed to 1170, as I prefer that the latch slide be modified as shown in Fig. 9. The new parts added by my invention are shown by reference characters ranging between 2000 and 2135.

*Manually set selection mechanism*

The mechanism for setting up the keyboard factor may be considered as comprising a manually operated and a power-operated portion, as shown in the patents above-mentioned. The manually operated portion is designed to be moved to a selected controlling position by the depression of keys, and the power-operated portion is designed to be brought into operation immediately prior to the operation of the calculating mechanism and to act under the control of the manually set mechanism to move elements of the calculating mechanism to the proper position to enter the value set up on the keyboard into the accumulator.

In the machine designed for calculation in the decimal system, the keys are preferably arranged, as shown in Fig. 1, in a plurality of ordinal sections of ten keys each, the number of sections provided depending upon the magnitude of the factors with which the machine is designed to deal. These keys are representative of the values "1" to "9" inclusive and an ordinal clear key, the clear keys conventionally being placed as a bank below the bank of "1" keys. As shown in Fig. 1, each key section comprises the usual number of value keys 100 affixed to key stems 103 (Fig. 2). The key stems are slidably mounted in a suitable key frame, or channel, 101 and are normally maintained in raised position by suitable coil springs 102 (Fig. 2). All of the key stems 103 are of the same length, and each has a cam extrusion 116 which, upon depression of the key, pushes a slotted key locking slide 1170, slidingly supported on the lower side of the key channel 101, to the rear (to the right in Fig. 2), releasing any other latched down key in the same order. Upon full downward depression of any value key stem, this slide, pressed forward by spring 118 (Fig. 9) snaps back to initial location, and, by overlying the upper end of extrusion 116, latches the depressed key in its operative position. The foremost key (Fig. 1) in each section is a zero, or clear, key and is provided for the sole purpose of moving the latching slide 1170 to release any latched down key in the same section, as is conventional in the art.

Besides the individual clear keys for each order described above, another clear key 122 (shown in Figs. 1 and 9) is provided which, upon depression, will release every depressed key on the entire keyboard. This clear key 122 is normally maintained in raised position by spring 123 and carries a roller 124 which, upon depression of the key, engages an upwardly extending finger on a bail 125. The bail, or gate, 125 extends across the full width of the keyboard and is journalled on studs 126 fixed in the frames, not shown. This gate is provided with an arm 127 having an angular portion presenting a curved face disposed directly in front of all of the key latching slides 1170. Whenever said clear key 122 is depressed the gate will be rocked (clockwise in Fig. 9) about studs 126, thereby moving all slides 1170 to the rear and thus releasing all latched keys.

Disposed beneath the value keys "1" to "9" inclusive is a differentially settable bar 120 (Figs. 2 and 9) which is pivotally suspended from the key section frame 101 by means of two parallel links 128 and 129. The bars 120 and their links are identical with those of the patents, except the front mounting comprises a slot 1200 in bar 120 embracing a pin 1280 in the lower end of link 128, thereby permitting lifting of the forward end of bar 120 for a purpose hereinafter described. This bar 120 has nine identical notches 130, each of which has at its bottom a downwardly extending locking notch, or slot, 131 adapted to receive the lower end of a key stem 103. The vertical center lines of the key stems 103 are spaced an equal distance apart. This distance, however, is slightly greater than the spacing between successive slots 131, so that each succeeding slot 131 will be spaced one increment further away from its cooperating key stem. This spacing is proportioned in such a way that depression of a value key will cam the bar 120 to the rear a number of increments equal to the value represented by the depressed key.

Movement of each bar 120 is utilized to set up a mechanical representation of the selected value, whereby the calculating mechanism may be accordingly controlled as hereinafter mentioned. A series of swinging segment members 132 (Fig. 2) are mounted upon a common shaft 137, there being one segment for each order of the keyboard. Each segment is provided with a pin 163 which is engaged by a notch 1630 in the selection bar 120, whereby the segment 132 is rotated in increments of equal angularity to a differential position representative of the value of the depressed key. Each member is provided at its opposite ends with arcuate racks 138 and 139 which serve to transmit the movement of the differential bar 120 respectively to a check dial assembly 140 and a cam unit 146. The upper rack 138 meshes with a check dial gear (see Fig. 3), to rotate the check dial differentially. The check dials 140 are rotatably mounted on shaft 141, adjacent the rear of the keyboard, and are viewable through suitable windows 147 in the cover plate, whereby the value set up on the entire keyboard may be read on a straight line of dials.

The cam unit 146 which is also positioned by movements of bar 120 and segment 132 forms a mechanical representation of the value set up in the respective order of the keyboard and is utilized to control the setting of the calculating mechanism. Each selection cam unit 146 is composed of a gear 151 and five differentially shaped cams affixed thereto, as described in said patents (only cam 152 being shown in Fig. 2). The construction of these cams and their arrangement and operation is described in each of the above-mentioned patents and need not be repeated here. It suffices to say that these cams rotate with the gear 151 to represent the value set in that order of the keyboard, and are sensed during a sensing operation by cooperating feeler arms which are operative to position the power-set selection mechanism next to be described.

*Power-set selection mechanism*

After the setting of the manually operated selection mechanism heretofore described, and upon manipulation of one of the operating controls, the power-operated portion of the selection mechanism is brought into operation prior to the operation of the calculating mechanism. This power-set selection mechanism acts, under the control of the cam units 146, to move the elements of the actuating mechanism to the proper position to condition it for effecting entry of the value set in the keyboard into the accumulator. One of the features of the machine with which the present invention is associated, is the fact that the actuating gearing is engaged with the accumulator gearing prior to operation of the motor driven digitating mechanism, the entry of different amounts being effected by the selecting mechanism varying selectively the rate at which each registering element may thus be driven.

Basically these power-operated selection mechanisms comprise three shafts: The half-speed shaft 166, quarter-speed shaft 167 and the twelfth-speed shaft 168. These shafts are so connected to the motor, through gearing and a cyclic clutch, not shown, that the shaft 166 rotates through 180° for each cycle of operation, shaft 167 rotates through 90° during each cycle, and shaft 168 moves through 30° during each cycle.

Associated with the drive shafts just mentioned, in each order of the machine, is a set of five selection plates 172. Each of these plates is settable by an arm 210 into one of three positions: The neutral central position shown in Fig. 2, or it can be rocked clockwise or counter-clockwise therefrom. The selection plates 172 are locked in any of the adjusted positions by means of a power-operated detent 236 engaging suitable slots 238 in the plate, as shown. The selection plates are simultaneously set by a power-driven mechanism, fully shown and described in said patents, which includes the arm 210 for each such plate, the arms being operated by a sensing means, not shown herein, which sense the position of the various cams, such as 152, of the cam assembly 146. Thus, depending upon the angular positions of the cam assembly 146, four of the selection plates 172 are held in their intermediate, or neutral, position and one will be moved either to the right or to the left by the arm 210. Mounted on each selection plate 172 is an idler gear, such as 173, and a second idler, such as 174. The second idler 174 meshes with a selection gear, such as 171, which is keyed to a sleeve 169 rotatably mounted on the transverse shaft 170. Associated with each such selection plate, in the plane of the large idler 173 are two drive gears, mounted on two of these three shafts, such as gear 175 on the half-speed shaft 166 and the gear 176 on the quarter-speed shaft 167.

Thus, if the plate 172, shown in Fig. 2, is rocked clockwise the idler 173 will become enmeshed with gear 175, while if it is rocked counterclockwise the large idler 173 will become enmeshed with the drive gear 176. If the plate 172 is left in its intermediate position shown, the idler 173 is disengaged from both gears and will therefore not be driven by either. The size of the gears, such as 175, 176, 173, and 174, are selected so that for each setting of the five selection plates 172, a selected differential rotation is given to the gear 171 keyed to the sleeve 169. These gear ratios are fully explained in said patents and need not be described here. Also keyed to the sleeve 169 is the driving gear 189 which is meshable with the accumulator gearing as will now be described—it being understood that this drive gear 189 is given differential rotation by one of the shafts 166, 167 and 168, through the differential gearing here briefly mentioned, but fully shown and described in said patents, the differential gear train being selected by the sensing of the cam assembly 146.

Accumulator mechanism

From the foregoing description of the selection mechanism it is apparent that a number comprising a plurality of figures can be registered upon the several ordinal sleeves 169 by differentially driving the gears attached to these sleeves various proportionate distances. However, in order to perform any mathematical computation, mechanism must be provided for not only advancing an accumulator dial in accordance with the rotation of the drive gear 189, but also means must be provided for effecting a tens-transfer between the various orders of the register.

This is accomplished by the conventional accumulator mechanism mounted in a carriage 250 shiftable across the machine. The carriage is supported in the machine for transverse shifting in either direction upon shafts 259 and 260, which slide through suitable bushings (not shown) mounted in the side frames of the machine. The carriage frame comprises end plates (not shown) connected by a formed top plate 252. Mounted at even ordinal intervals between the end plates are a series of carriage brace plates 255 having lugs 261 meshing with spaced slots in the top plate 252. The top plate 252 and the ordinal brace plates 255 are interlocked at the front and back of the top plate to provide a rigid frame for the carriage and the accumulator mechanism therein. A plurality of locked spacing combs such as 263 add to the rigidity of the structure.

Supported by the several brace plates 255 is a "dipping carriage," which includes a series of plates 266 one of which is mounted adjacent each of the carriage brace plates 255. The plates 266 forming the dipping carriage are pivotally mounted on the respective brace plates 255 by any suitable means, such as aligned rivets 2620. These dipping plates 266 are spaced and braced by two combs 267 interlocking with slots in each plate and held in place by rods 268. The plates are also connected at their rear ends by a common bail 269, known as the "dipping bail" by means of which the entire body of the dipping part of the carriage can be simultaneously oscillated about aligned rivets 2620. Normally the dipping carriage is in the raised position shown in Fig. 2. However, at the beginning of a cycle of digitation the dipping carriage is lowered by means of the bail 269 into the position in which the accumulator idler gears 271 are enmeshed with the ordinally related drive gears 189. The idlers 271 are rotatably mounted on a common shaft 272, supported by the dipping plates 266. The dipping of the carriage is controlled by the mechanism fully shown and described in said patents, but it can be mentioned here that the carriage dipping occurs substantially simultaneously with the setting of the value in the power-actuated selection mechanism previously mentioned and prior to operation of the main drive clutch, not shown, whereby the entire gear train to the accumulator gear is enmeshed prior to digitation.

The various ordinal units of the accumulator are mounted on a common shaft 270 carried by the various plates 266 of the dipping carriage. In each order, the accumulator mechanism includes a drive gear 273 rotatably mounted on a collar 293 supported by the shaft 270. This gear is driven by the idler 271 rotatably mounted on the shaft 272 also supported by the dipping carriage, as previously mentioned. Associated with the accumulator mechanism is a suitable detent 319 in each order, rotatably mounted on a shaft 320, likewise journalled in the "dipping carriage." Normally the nose of the detent engages the teeth of the idler gear 271 as it is pulled in a counter-clockwise direction by a suitable spring 317. However, as the carriage is dipped for digitation the lower arm of the detent engages the crossshaft 565 to rock the detent clockwise, and thus disengage it from the idler gear.

It will be understood, of course, that the accumulator mechanism includes the customary dials 279 and a suitable tens-carry mechanism, preferably of the type shown and described in said patent, and shown in part in Fig. 6 hereof. Although such elements are not a part of my invention, a suitable tens-carry mechanism is necessary to the proper operation of the machine and will therefore be briefly described. Indirectly this ten-carry mechanism is important to my invention as it is utilized to some extent in clearing the accumulator register, which is an essential part of my invention.

It will be noted in Fig. 6 that each ordinal unit comprises a spider 274 which is rigidly secured to a sleeve 275 rotatably mounted on shaft 270. The spider carries an internal ring gear 276, and also a thin shell which is sufficiently wide to accommodate digits ranging from "0" to "9" arranged as shown. One of the arms of the spider carries an angular extension 278 which extends beyond the right side face of the thin shell of the accumulator dial. The extension 278 serves as a zero stop in resetting operations.

Integral with the sleeve 275 is a sun gear 280, abutting one of the dipping plates 266. Interposed between the sun gear 280 and the spider 274 is a snail cam 281 and spacer 285. A projection 283 from the spider extends into an enlarged slot 288 in the cam to permit limited movement of the cam with respect to the spider.

Located immediately to the right of the mechanism just described is a planetary gear mounting plate 292 fixed to the accumulator drive gear 273, which is driven by the actuator gear 189 through the intermediate or idler gear 271 when the plates 266 are dipped. The spur gear 273 and integral planetary plate 292 are rotatably mounted on the sleeve 293, which in turn is rotatably mounted on the sleeve 294. Plate 292 is in turn fixed to a planetary gear mounting arm 296 by a pair of diametrically opposed studs 297, and on each of said studs is mounted a planet gear 298 meshing with the ring gear 276 carried by the spider 274, and with another sun gear 299 formed integrally with the sleeve 293. Thus, the spur gear 273, the planetary plate 292, planet gears 298 and the ring gear 276 constitute a planetary assembly which rotates about the sun gear 299 and comprises a means by which the numeral bearing shell 279 can be rotated by the actuating mechanism of the machine through the medium of idler gear 271 as hereinbefore described.

Means are provided for driving the spider 274 and its associated dial shell 279 by means of the spider 274 of the next lower order, independently of any movement of gear 273. This means includes a spider 300 secured to the right end of the above-mentioned sun gear sleeve 293, which spider carries an internal gear 301. Sleeve 294, which, as previously described, supports the sleeve 293 on shaft 270, is provided with a double-arm member 304, one arm 306 of which supports a stub shaft 307 to which are fixed planet gears 308 and 309. The planet gear 308 meshes with the internal gear 301 on spider 300, while the planet gear 309 meshes with the sun gear 280 of the adjacent lower order. Sleeve 294 also includes an integral spacer 310, so that the gear 308 is positioned in alignment with the ring gear 301 and does not abut the spider 300. The central portion of member 304 is provided with a segmental gear 311 (Fig. 8), which meshes with the teeth of a gear segment 312 formed on a lever 313 rotatably mounted on shaft 272. Lever 313, includes an ear 314 extending to the right, through the adjacent dipping plate 266 to engage a lever 315 which carries a roller 316 (see Fig. 6) in the same plane as the snail cam 281 of the next lower order, as is fully described in the above-mentioned patents. The lever 313 is biased in a clockwise direction (in Fig. 8) by the spring 317, tensioned between an ear on said lever and an ear on detent 319. This construction permits the amount of movement of the dial 279 imparted to it by tens-carry from the next lower order to be backed off by the snail cam as fully described in said patents.

For the present it suffices to point out that in operation the gear 273 is driven by the actuating mechanism of the aligned order, and revolves planetary gears 298 about shaft 270 as a center. Whenever a given amount is thus entered in any one unit of the accumulator, member 304 being held in fixed position, one-tenth of that amount will be entered in the next higher order by means of the carrying mechanism comprising sun gear 280, fixed to spider 274 and driving planetary gears 308 and 309. These in turn drive internal gear 301 fixed to sleeve 293 of the next higher order unit in a direction opposite to that of spider 274, and, by rotating said sleeve, drive sun gear 299 integral therewith. If gear 273 and studs 297 (of the higher order) are stationary, the rotation of sun gear 299 rotates ring gear 276 in the direction opposite to that of gear 299, and therefore in the same direction as that of the lower order dial transmitting the carrying. If gear 273 of the higher order is moving to introduce digitation as previously described, ring gear 276 will move by an amount equal to the resultant of that produced by the rotation of both gear 299 and gear 273. Thus, the movement of any higher order dial becomes the resultant of the digitation entry into its own order and the carry movement from the next lower order, as is more fully described in said patent.

While the snail cam 281 and spider 274 may be relatively secured to rotate as a unit, it is preferable that there be a certain amount of play between these elements. For this purpose the snail cam is secured on the spacer, or sleeve, 285 mounted for rotation about a cutaway portion of the sun gear 280. A small wire spring 289 is disposed around sleeve 285 and extends between the projection 283 on spider 274 and a stud (not shown) on the cam.

*Accumulator clearing mechanism*

The accumulator clearing mechanism associated with the accumulator just described, is fully shown and described in the above-mentioned patents, particularly Patent No. 2,211,736. The theory of clearing that is embodied in these patents is based upon the fact that if ring gears 301 are locked against movement and the gears 271 are freed from the breaking effect of pawls 319, while the arms 304 are rocked to cause rotation of the planetary pinions 308 and 309 from engagement with the teeth of the stationary ring gear, such rotation of gears 308 and 309 will drive the gear trains to rotate the spiders 274 and their attached numeral wheels 279 backwardly to the position in which their zero digits align with the sight openings 318 in the carriage. Rocking of the arm 304 can readily be effected by means of the lever 313, the teeth 312 of which engage the teeth 311 on the arm 304. In this construction it is necessary to provide a stopping means to be placed in the path of lugs 278 carried by the spiders 274 to prevent them from being driven beyond the zero position. After the dials have been returned to their zero position the breaking pawls 319 are then restored to operative position, after which the ring gears 301 are then unlocked, leaving all of the dials of the register aligned in the zero position.

The necessary rocking of the arm 304 is secured from rocking shaft 320. This shaft is rocked, as shown in said patents, by rocking of the shaft 259 which also acts as the front rail for carriage 250, by means of levers on the right-hand end of said respective shafts. Since the rocking of the shafts is conventional it will not be described in detail. It should suffice to mention that the shaft 259 is rocked by power upon depression of a suitable clear key 373 (see Fig. 1). Keyed upon shaft 320 (Fig. 7), are rocking levers 342 keyed thereto. The rocking of lever 342 is transmitted to an adjacent actuating lever 350, rotatably mounted on shaft 320, by a relatively strong torsion spring 343. The movement of these levers 342 and 350 is transmitted to pawls 319 as each pawl has a lateral projection 351 which is engaged by the associated lever 350 when the latter is rocked—thereby freeing gears 271.

The rocking of actuating lever 350 also acts to lock the ring gears 301 and place zero stops for the numeral wheels 279, and for this purpose is provided with an extension 352 engaging a slot within a lever 353 mounted on shaft 272. Clockwise rocking of lever 350 (Fig. 7) pushes lever 353 in a counter-clockwise direction, whereupon lateral projection 354 on the lever is placed in a dial stop position. The lateral projections 354 are each of sufficient width to engage both the zero stop projections 278 on each dial assembly (and thereby limit it against movement past zero position during clearing of the accumulator), as well as to engage one of the four projections 302 on the spider 300 and gear 301 (thereby providing the afore-mentioned stopping means for ring gear 301). Rebound of the dials is prevented by a resilient hook member 355 on each lever 353, which engages the other side of projection 278 in each assembly from that engaged by projection 354, thereby preventing rebound of each dial.

The dials 279 are returned to zero position by mechanism comprising a lateral projection 356 on each lever 313 which are engaged by extensions 357 on pawls 319, to rock levers 313 counterclockwise on shaft 272 against the pull of spring 317. The teeth 312 on levers 313 are constantly in mesh with teeth 311 on arm 304, whereby rocking of levers 313 acts to rock arms 304, and thus rotate planetary pinions 308 and 309 by feeding the former over the teeth of locked ring gears 301. Since gears 271 are free to rotate, rotation of planetary pinions 308 and 309 drives gears 280 to rotate spiders 274 and their attached numeral wheels 279 backwardly to the position in which the zero digits align with the sight openings 318. After such clearing, the shaft 320 is then rocked in a counter-clockwise direction to remove stop projections 354 and 355 from cooperative relationship with lugs 278 and release stops 302 on ring gears 301. Simultaneously therewith the pawls 319 reseat between the teeth of gears 271 and the segments 313 are returned under tension of spring 317 until the engagement of roller 316 with the periphery of snail cam 281 blocks further movement of segment 313. The shaft 320 is rocked to its original position by a suitable spring, not shown herein, but fully shown and described in said patents.

It is believed that the above description is sufficient to explain clearing of the accumulator register of said patents, but a more complete description can be found in the patents if desired. It can be mentioned here that other mechanisms of the machine with which the present invention is associated, such as the clutch, motor drive, programming mechanisms, and the like, are conventional with the machines described in said patents. As they form no particular part of my invention they are not here described.

Back transfer mechanism

The mechanism heretofore described is conventional in the machines of the patents above-mentioned, and no claim is here made as to invention therein. Briefly my invention relates to mechanism by means of which a value standing in the register dials 279 is, upon clearing of the accumulator, transferred to, and retained in, the check dials 140, and thence through the selection arm 132 to the cam assembly 146. In this manner a value accumulated in the accumulator dials 279 may be used as the keyboard factor in a succeeding operation without manually copying the value into the keyboard. Such operation is not only faster, but is more accurate than is possible by manually copying the value standing in the accumulator into the keyboard. The result can be readily secured by providing interponent gearing between the accumulator gear 273 and a suitable gear 2082 affixed to the check dial 140, one of the gears of said train being translatable laterally so as to selectively disengage or engage the gear train between the two dials, and so arranged as to permit carriage shifting.

In the machine of the patents above-mentioned, accumulator dials are conventionally numbered in the direction shown in Fig. 6, and the check dials 140 are numbered as shown in Fig. 3. Thus, if the gears rigidly secured to said dials are connected by a train of three gears, and the accumulator dial is cleared by returning from a value back to zero, then the check dial and its gearing will be advanced from zero the same number of steps as the accumulator gear was returned. As the setting of a value in the check dial automatically sets the cam assembly 146 to the selected position, such an operation results in setting the accumulator value into the internal portion of the manually set selection mechanism, automatically and rapidly.

Such an operation is initiated, in my invention by depression of a suitable back transfer key, such as 2001 of Fig. 9. This key must perform several functions:

1. It must either clear the keyboard and the selection mechanism controlled thereby, or it must be operable to sense a value standing in the keyboard and render the mechanism inoperable until the keyboard is cleared. For purposes of simplification I show the latter form, although it will be obvious that the mechanism could be designed to automatically depress the keyboard clear key 122, or operate the mechanism controlled thereby, upon depression of the key 2001. However, as it is much simpler to sense a zero or nonzero position of the selection slides 120, I show my invention in that form.

2. A detent means must be enabled to hold the check dials in an adjusted position, which detent must be so designed as to permit the rotation of the check dial 140 by the clearing of the accumulator dial 279.

3. The gear train must be rendered operative to connect the accumulator gear 273 to the check dial gear 2082.

4. The clearing mechanism for the accumulator dials 279 must then be operated.

5. As the clearing mechanism returns to its normal position, the gear trains must be disabled so as to disconnect the accumulator gear 273 from the check dial gear 2082.

The key 2001 is mounted upon a suitable key stem, such as 2002, extending through the cover plate 2000. The key 2001 can be placed in any suitable position, but I prefer to place it between the plus bar 800 and the short cut multiplication key 1120 as shown in Fig. 1. As shown in Fig. 9, I prefer that the upper part of the key stem 2002 be parallel to that of the clear key 122, that is, longitudinal of the machine, and that the lower portion be bent at right angles thereto, as shown in Figs. 9 and 10, to provide a shoulder 2003 for the purposes hereinafter mentioned. The lower end of the key stem 2002 moves through a slot (not shown) in a spacing bracket 2004, formed on the right-hand end of a transverse plate 2005 extending across the keyboard adjacent the lower edges of the selection slides 120. The upper edge of the plate 2005 preferably extends above the lower edge of the selection bars, or slides, 120 and is notched, as shown in Fig. 10, at 2006 to permit the selection slides 120 to move therethrough.

1. *Keyboard sensing.*—Associated with the plate 2005 is a slide 2010 (see particularly Fig. 10) mounted on the plate by means of slots 2011 in the slide embracing pins 2007 on the plate 2005. The slide 2010 is provided with a number of ordinally arranged noses 2012 normally lying adjacent the related selection slide 120. Each selection slide 120 is provided with a notch 2013 of sufficient size to permit the passage of the projection, or nose, 2012 as slide 2010 is translated to the left. These notches 2013 are so positioned on the selection bars 120 that they register with the shoulders 2012 only when each selection bar is in the zero position. Thus, if any selection slide of the keyboard is out of zero position, i. e., it registers any value, however small, the sensing slide 2010 cannot be moved to the left. The slide 2010 is moved to the left by depression of the key stem 2002 by any suitable means, such as a pin 2014 affixed to the slide engaging a camming slot 2008 in the key stem, as shown. Thus, when the key is depressed, the cam slot forces the pin 2014 and slide 2010 to the left, thereby sensing a zero condition in the selection mechanism. If one of the selection slides 120 is out of zero position, then the movement of the slide 2010 is blocked, and the key 2001 cannot be depressed.

Associated with the zero sensing mechanism just described, I provide means whereby the slides 120 may be moved as required by the back transfer operation. For this purpose the shoulders 2012 have a width such that the shoulder passes entirely through the associated selection slide 120 by the time the slide 2010 has reached its extreme position. Thus, the slides are free to move as determined by the rotation of the check dial 140 during the transfer operation. I also provide the shoulders 2012 with a camming face 2015 on the right-hand side so that when the slide 2010 moves to the right upon release of the key 2001, the various selection bars 120 can be cammed upwardly without changing their setting in any manner. To permit the camming of the selection slides 120 upwardly I provide a pin and slot connection between each selection slide and its forward (left-hand in Fig. 9) supporting link 128. Thus, the pin 1280 of the link 128 engages a slot 1200 in the selection slide 120, as shown in Fig. 9.

The key stem 2002 is provided with a latching notch 2009 which is adapted to be engaged by an ear 2020 on a latching slide 2021. The latching slide 2021 is mounted on the lower side of the cover plate 2000, for longitudinal movement thereon, by suitable pin and slot connections (only the pin 2022 being shown). The slide 2021 is urged to a forward position by a suitable spring 2023 tensioned between studs 2024 on the slide and 2025 on the frame plate. The forward end of the slide is bent over to form a forwardly extending ear 2026 which carries a stud 2072. The stud 2027 lies in the plane of, and in a position adjacent to, the upwardly extending arm of the bail 125, as shown in Fig. 9, whereby the rocking of the bail 125 is operative to release a back-transfer key 2001.

It can be mentioned at this point that the back-transfer key, when depressed, is latched in its depressed position and remains in such position so long as it is desired to maintain the transferred value in the selection mechanism. Depression of the back-transfer key will be operative to enable a single transfer operation, after which the interponent gearing is disengaged and can be re-engaged only by release of key 2001 and consequent clearing of the keyboard. After completion of the back transfer operation, the other operation control keys of the machine are free for use, even though the back-transfer key is held depressed, so that the factor transferred into the selection mechanism from the accumulator can be used in any desired operation, and as often as desired. For example, after a back transfer operation, various operations of the machine can be performed, such as multiplication or division, and the results accumulated in the accumulator dials and the accumulated values cleared from such dials without hindrance from, or effect upon the back-transfer key or the factor locked in the selection mechanism. Thus, the transferred value stays in the selection mechanism, and the key 2001 is held depressed, until the keyboard is cleared either by depression of the keyboard clear key 122 or by an automatic operation conventional in this machine.

2. *Enabling check dial detent.*—The depression of the back-transfer key 2001 also enables a detent mechanism for holding the check dial in its adjusted position after the value has been transferred thereinto. Many suitable mechanisms could be suggested for this purpose. In Fig. 9 I show a preferred form of such a mechanism, which is preferred only because it is extremely simple. The mechanism shown comprises a two-armed lever 2030 pivotally mounted on a stud 2031 affixed to a suitable bracket, not shown. The upper edge of the lever 2030 underlies the shoulder 2003 on the key stem 2002, whereby depression of the key and key stem operate to rock the lever 2030 (counter-clockwise in Fig. 9). The lever 2030 is resiliently biased in an opposite direction (clockwise in Fig. 9) by a suitable spring 2032 tensioned between a stud on the frame (not shown) and an ear 2033 on the rear end of the lever 2030.

Rocking of the lever 2030 operates a second two-armed lever 2040 pivotally mounted on a transverse shaft 2041. The forward end of the second lever 2040 overlies the ear 2033 on the rear end of the lever 2030, whereby the rocking of the lever 2030 (counter-clockwise in Fig. 9) rocks the second lever 2040 in the opposite direction. The rear end of the second lever overlies a pin 2045 affixed to an arm 2046 of a transverse bail 2047. The transverse bail extends transversely across the machine, the full width of the kyeboard, and is pivotally mounted on a cross-shaft 2048. Operation of the bail 2047 controls positioning of a plurality of ordinal holding pawls, one for each order of the machine. These holding pawls are preferably of the live, or resilient, type so that while urged into operative position they can yield in the opposite direction if need be. A preferred form of the holding pawls is shown in Figs. 2 and 9, and comprises a series of ordinally arranged arms 2055, likewise pivotally mounted on the shaft 2048 and held in proper ordinal position by suitable sleeves 2054. Each such arm 2055 is provided with a projecting ear 2056, as shown. Associated with each arm 2055 is a holding pawl 2057, likewise pivotally mounted on the shaft 2048 and likewise provided with a projecting ear 2058. The ears 2056 and 2058 of the two arms are connected by a suitable tension spring 2059, whereby the rocking of the arm 2055 (counter-clockwise in Fig. 7) resiliently urges the pawl 2057 in the like direction. The outer, or rear, end of the holding pawl 2057 is provided with a detent nose 2060 suitable for engaging the gear 2082 affixed to the check dial 140. The pawls are yieldably biased to a disengaged position by springs 2062, tensioned between a pin 2063 on the arm 2057 and shaft 137, and are rocked to engaging position by bail 2047.

It can be mentioned at this point that in the machine described in the patents above-mentioned, the check dial is spring-urged to its zero position through its connection with the manually set selection mechanism previously described. As a value is set in the keyboard this check dial is rotated (clockwise in Figs. 2, 5 and 9) to show the value set in the keyboard. In a normal operation a value so selected is held in the check dial 140 by the latching of the selection slide in the selected position through the latching down of the value keys 100, as above-mentioned. It was mentioned above that before the back transfer can take place the keyboard must be cleared, so that all of the check dials are standing at zero. As the check dials are rotated during the clearing of the accumulator (again clockwise in the figures just mentioned), the normal tendency would be for the values to disappear as soon as the two dials were disengaged. It is therefore necessary to provide the holding pawl 2057 with a nose which locks the check dial 140 against counter-clockwise rotation. However, as the detent, or holding pawl, 2057 will be engaged prior to the clearing of the accumulator dials it is preferred that the opposite edge of the nose 2060 be shaped to form a cam 2061 which, when engaged by a gear tooth of the gear 2082, rocks the detent arm outwardly away from the gear, thereby permitting the gear to be properly positioned. As soon as the gear is so positioned, the spring 2059, which is stronger than spring 2062, urges the nose 2060 into the space between adjacent teeth on the gear 2082, thereby locking the check dial and the selection mechanism in the position representative of the value transferred to it from the accumulator.

It sometimes happens that, in problems involving the transfer of a value from the accumulator into the selection mechanism, the operator will desire to change one of the ordinal factors in the selection mechanism. I therefore show means for manually changing any ordinal value in the selection mechanism, even though a value has already been transferred thereinto from the accumulator. Such a mechanism is not essential to a machine of this type, but as it does have some value I prefer to have it included. A simple form of such mechanism comprises a nose 2070 integral with the rear end of each latching slide 1170. Upon movement of the ordinal latching slide 1170 (to the rear) to release a value set in the keyboard, the nose 2070 engages a pin 2071 on the forward arm of a bellcrank 2072. The bellcranks 2072 are pivotally mounted on the transverse shaft 137, there being one bellcrank in each order of the machine. The upper arm of the bellcrank 2072 is slotted as shown at 2074 to receive the pin 2063 on the detent, or pawl, 2057. It will be obvious from a review of Fig. 9, where these parts are shown, that the rearward translation of the latching slide 1170 will rock the bellcrank 2072 counter-clockwise, which operates through the pin and slot connection 2063, 2074, to rock the nose 2060 of the detent arm 2057 downwardly out of mesh with the teeth of gear 2082. Thus, if the zero key has been depressed the check dial 140 will be enabled to return to the zero position, or if any value key has been depressed the new value will be locked (in that particular order) by the latching of the value key 100 in a conventional manner as well as by the detent 2057. By this means an operator is enabled to change one of the ordinal values in the selection mechanism after the value has been transferred from the accumulator into the selection mechanism.

3. *Engage gear train.*—The third operation caused by the depression of the back-transfer key 2001 is to interpose a connecting gear train between each dial 279 of the accumulator register and the ordinally related check dial 140. It will be understood that values standing in orders of the accumulator to the right or left of the keyboard will be lost during this transfer. A simple and preferred form of gear train is shown particularly in Fig. 5 and also in Figs. 3 and 4. I provide an ordinal idler gear 2080 associated with each order of the accumulator register. These gears are preferably mounted on a common shaft 2081 carried by the dipping plates 266. In my preferred embodiment, the gears 2080 are constantly enmeshed with the related accumulator gear 273, the gears not being displaceable laterally from their meshing position. In the same plane as the accumulator gear 273 and the accumulator idler 2080 is a gear 2082 affixed to the ordinally related check dial 140. This gear 2080 meshes with an idler 2083, also in the plane of the first idler 2080. The check dial idlers 2083 are mounted on a common shaft 2084 and are held in properly spaced relationship by spacing sleeves 2085.

It will be recalled that the front carriage rail is the shaft 259, which conventionally is milled to provide diametrically opposed slots, or keyways, 2590 for the reasons described in said patents. I prefer to utilize this shaft 259 as the shaft for the interponent gears 2086 which are rotatably mounted thereon and which are also slidable thereon. Normally these interponent gears 2086 are to the right of the plane of the idlers 2080 and 2083, as shown in Fig. 3, but are slidable along the shaft 259 so that they will be in the plane of the two idlers, whereby rotation of idler 2080 will be operative to rotate idler 2083 and the associated check dial 140. The two idlers 2080 and 2083 and the interponent gear 2086 are suitably chamfered, as shown in Fig. 5, in order to provide for their ready meshing when the interponent gear is translated into the plane of the idlers. Preferably these interponent gears 2086 are provided with long hubs 2087 which are operative as spacers to hold the gears in proper ordinal relationship and to move them in unison into or out of engagement with the associated idlers.

Associated with the interponent gears 2086 is a comb 2088, lying in one of the keyways 2590 of the shaft 259. This comb is provided with a plurality of projections, or teeth, 2089 which separate one gear 2086 from the adjacent hub 2087, as shown in Fig. 3. Secured to the comb 2088 is an arm 2090 which is operative to set the comb in either of its adjusted positions, under control of the cam 2104 hereafter to be described, and the opposed compression spring 2091 (see Fig. 4) seated between the left side frame (not shown) and a collar 2092 on the left end of the comb. Thus, the comb is normally urged to the right, so that the interponent gears 2086 will be out of mesh with the two idlers 2080 and 2083, but upon movement of the arm 2090 by the cam 2104, the comb 2088 and gears 2086 are shifted to the left into mesh with the associated idlers.

The arm 2090 is slidably mounted on the shaft 2084 as well as on shaft 259 (see Fig. 12), thereby preventing rotation of the arm 2090 when it is engaged by cam 2104.

The mechanism for moving the comb 2088 from the depression of the back-transfer key 2001, will now be described. The rear arm of the two-armed lever 2030 is provided with a shoulder 2035, as is shown in Figs. 9 and 12. Rocking of the lever 2030 causes this shoulder 2035 to engage a pin 2101 on a long link 2100. The front end of the link 2100 is urged into engagement with the upper edge of the rear arm of the lever 2030, which supports the front end of the long link, by a suitable spring 2102 (Fig. 12). The rear end of the long link 2100 is supported by, and rotatably mounted on a pin 2103 which is affixed to the cam plate 2104. The cam 2104 is rotatably mounted on the right end of the check dial shaft 141, which shaft is extended for this purpose. The cam 2104 is provided with a camming arm 2105 which is operative, when the cam is rocked clockwise from the position shown in Fig. 12, to push the arm 2090 of comb 2088 to the left to cause engagement of the interponent gears with their idlers. The link 2100 is resiliently urged toward the rear, and consequently the cam 2104 is urged to its counter-clockwise position shown in Fig. 12, by a suitable spring 2106 tensioned between a stud 2107 on the link 2100 and a suitable stud (not shown) on the frame of the machine. Thus, the depression of the back-transfer key 2001, through the rocking of lever 2030, and the translation of link 2100, and rocking of cam 2104, is operattive to translate the interponent gears 2086 into mesh with the idlers 2080 and 2083.

It can be mentioned at this point that in the machine made under the above-mentioned patents the accumulator gear normally has fourteen teeth, which because of the feed above-mentioned, is operative to rotate the accumulator dial 279 through ten digital values. A suitable gear train to cause rotation of check dial 140 corresponding to the rotation of the accumulator dial 279 is to provide fourteen teeth on the accumulator idler 2080, ten teeth on the interponent gear 2086, eight teeth on the check dial idler 2083 and ten teeth on the check dial gear 2080.

It will be recalled that the shaft 259 is rocked during the clearing operation. However, this rocking will not effect the transfer from the accumulator into the check dials and thence into the selection mechanism. The interponent gear 2086 is moved into meshing relationship with the two idler gears 2080 and 2083 prior to the clearing of the accumulator. As the shaft 259 is rocked during clearing, it is obvious that the gears are engaged before the shaft is rocked. The shaft is rocked in the opposite direction to rotation of the interponent gear (rocked counterclockwise in Fig. 5) so that the positive drive from the accumulator gear 2073 through the idlers and interponent into gear 2082 will not be effected by the rocking of shaft 259. The entire gear train is held against rocking in the opposite direction by detent 2057, so that the return of shaft 259 to its original position is also ineffective to change the setting in the check dials.

In a mechanism of the kind described it is desirable that the interponent gears 2086 be held in an angular position for ready meshing with the two idlers 2080 and 2083. This could be accomplished by having one of the idlers a wide gear so that the interponent gear 2086 would never become unmeshed therefrom. However, I prefer to provide a detent for each such interponent gear 2086, so that the gear will be locked against rotation whenever it is disengaged from the idlers. One such detent is shown in Figs. 5 and 3. It is conventional in machines of the above patents to provide a plurality of ordinal separator plates 2095 in the check dial register. I prefer to extend the rear edges of these plates to form a nose 2096 which meshes with the gear teeth of the interponent gear 2086, thereby holding the gears against angular displacement when not engaged with the gears 2080 and 2083. As shown in Fig. 3, the lateral translation of the interponent gear 2086 moves the gear off the detent nose 2096 after the interponent gear becomes engaged with its associated idlers. In the return of the interponent gear 2086 to its normal disengaged position the gear will be engaged by the detent nose 2096 prior to disengagement with the associated idlers. Such a mechanism insures that the interponent gear 2086 will always readily mesh with its associated idler. It also insures that the idler gears 2080 can readily shift through the interponent gears 2086 without difficulty during carriage shifting, as the interponent gear 2086 is locked in the proper position therefor.

4. *Clear accumulator dials.*—The depression of the back-transfer key 2001 is finally operative to depress the accumulator clear key 373, which operation is timed to occur only after the detent 2057 has been rendered effective and the interponent gear 2086 moved into meshing relationship with its associated idlers 2080 and 2083. The means for accomplishing this result is shown particularly in Fig. 11. The forward end of the two-armed lever 2030, which is operated directly by the depression of the back-transfer key 2001, is provided with a lateral ear 2034. Cooperating with the ear 2034 is a pivoted plate 2115 pivotally mounted, as by pin 2116, to the lower end of the key stem 3730 of the clear key 373. The ear 2034 engages the top edge of the plate 2115, whereby the rocking of the lever 2030 depresses the plate 2115 and the key stem 3730—the latter operating in the usual manner to operate the clearing mechanism shown and described in said patents. The forward edge of plate 2115 is provided with a stud 2117 and the rear edge of the key stem 3730 is provided with a laterally projecting ear 2118. A spring 2119 tensioned between the stud 2117 and ear 2118 normally urge the plate 2115 rearwardly whereby it underlies the ear 2034 of lever 2030. The rear edge of the plate 2115 is provided with a camming face 2121 with which is associated a stud 2020 mounted on the adjacent frame plate, or bracket (not shown). Thus, depression of the forward end of lever 2030 depresses the key stem 3730 and in so doing, the pin 2020 cams the plate 2115 forwardly against the tension of its spring 2119. Immediately after the key stem 3730 has been depressed sufficiently to cause initiation of the clearing operation the plate 2115 will be cammed forward sufficiently to permit ear 2034 to slip by the rear edge of the plate, thereby permitting the key stem 3730 to be raised in its normal manner. By this means the accumulator clearing mechanism is given a single cycle of operation, even though the back-transfer key 2001 is locked in its depressed position at the end of its stroke. Further, in future operations the value transferred into the selection mechanism can be kept therein for a plurality of operations, after each of which the accumulator can be cleared by depression of the accumulator clear key 373 in the usual manner.

5. *Disengaging interponent gearing.*—It is necessary, during the return stroke of the clearing actuator arm 367 (Fig. 13) to disengage the interponent gear 2086 from the two idlers with which it is associated. It will be recalled that the back-transfer key is latched down to retain the value transferred from the accumulator in the selection mechanism. When the back-transfer key is released, as by depression of the keyboard clear key 122, the detent pawl 2057 is disabled, thereby permitting the selection mechanism and the check dials to return to the zero position. Thus, the back-transfer key 2001 in the preferred form of my invention, should be maintained depressed as long as it is desired to maintain the transferred value in the selection mechanism, but it is necessary that before the end of the clearing cycle the interponent gear 2086 be translated to the right, out of engagement with its idler gears, so as to break the connection between the accumulator dials and the check dials. This is accomplished by the mechanism shown particularly in Figs. 12 and 13.

Associated with the clearing actuator link 367 and the arm 388, which is keyed to the shaft 259, is a forwardly extending link 2125. The rear end of this link is pivotally connected to the rivet which connects the arm 388 to the actuator link 367, as shown in Fig. 13. The forward end of this link is slotted as at 2126 to embrace a stud 2127 secured to a supporting bracket, not shown. The parts shown in Fig. 13 are shown in their full-cycle, or inoperative position. The first portion of the stroke of the clearing mechanism is the movement of the actuator link 367 toward the rear, or right of this figure, rocking the shaft 259 counterclockwise and pulling the link 2125 rearwardly, or to the right. The link 2125 carries a riveted stud 2128 as shown in this figure. The rocking of the shaft 259 counter-clockwise, by means of levers not shown herein but fully shown and described in said patents, rocks the shaft 320 clockwise to operate the clearing mechanism as above-mentioned.

Associated with the stud 2128 is a camming lever 2130 (see Fig. 12) of generally triangular shape. This camming lever is provided with an arcuate slot 2131 across the base which embraces the stud 2041 about which the lever 2040 pivots. The lever 2130 is rocked (clockwise in Fig. 12) by a suitable spring 2132 tensioned between the rear end of the lever and a suitable stud on the machine, not shown. This camming lever has an upper edge 2133 which abuts against the stud 2107 on the link 2100. It is also provided with a slanting front edge 2134 which terminates in a rearwardly extending shoulder 2135 as shown in this figure. In the normal position of the parts, shown in Figs. 12 and 13, the stud 2128 on the link 2125 lies in front of the camming lever 2130, as shown in Fig. 12. During the first portion of the clearing stroke, i. e., during rearward rightward movement of links 367 and 2125, the pin 2128 engages the slanting edge 2134 of the lever 2130, rocking the latter about the pin 2107 on the link 2100, which acts as a pivot. It will be recalled that the link 2100 has already been pulled forwardly, so that the pin 2107 is located in the position shown by the dotted circle 2107a, and the stud 2128 will have engaged the cam edge 2134 behind the stud 2107. The camming lever 2130 can rock counter-clockwise against the tension of spring 2132 because of the pin and slot connections 2041, 2131, above-mentioned. At the end of this rearward stroke pin 2128 falls behind the shoulder 2135. Upon the return of the stroke of the actuator link 367, the link 2125 moves forwardly, the pin 2128 being engaged behind the shoulder 2135. This movement rocks the camming lever 2130 clockwise about the pin 2041 as its pivot, thereby lifting pin 2107 and its link 2100 upwardly to disengage the pin 2101 on the forward end of the link from behind the shoulder 2035 on the first lever 2030. This rocking of the link 2100 enables its spring 2106 to pull it rearwardly, thereby rocking the cam 2104 counter-clockwise to the position shown in Fig. 12, and thereby returning the comb 2088 to the right to move the interponent gears 2086 out of mesh with their associated idler gears 2080, 2083. By this means the interponent gearing is disengaged during the latter portion of the clearing cycle leaving the former accumulator factor locked in the check dials 140 and the related selection mechanism.

It is believed that the operation of my invention has already been fully described. However, it can be mentioned that a value registered in the accumulator dials 279 can be transferred into the ordinally related selection mechanisms by depression of the back-transfer key 2001. The depression of the key first senses whether the keyboard is clear, in which event the transfer can take place. If a value stands in the keyboard, it is obvious that an attempted transfer would not correctly set the value on the selection mechanism corresponding to that in the accumulator. While the depression of the key 2001 could be used to first clear the keyboard, it is generally just as satisfactory to sense whether the keyboard registers a value or is completely clear. In my preferred embodiment, the key 2001 can be further depressed if the sensing mechanism senses a zero condition of the keyboard, but depression of the key is blocked if a figure stands in any order.

Further depression of the back-transfer key 2001 enables the detent, or holding means, which includes the pawl 2057. As was mentioned before, in the machines of the patents referred to, the locking of the selection mechanism normally is occasioned by the locking of a value key in a depressed position. As the keys are not operated during the back transfer, it is necessary that additional means must be provided to lock the transferred value in the selection mechanism.

The depression of the back-transfer key 2001 also positions the interponent gear 2088 in operative position to form a gear train from the accumulator drive gear 273 to the check dial gear 2082. In the mechanism of the patents referred to, the setting of the check dial 140 is operative to set the selection mechanism, and particularly the cam assembly 146, to like value.

Further depression of the back-transfer key causes the operation of the clearing mechanism normally controlled by the accumulator, or "middle dial," clearing mechanism, thereby zeroizing the accumulator dials 279. Due to the fact that these dials are connected by the gear trains to the check dials, the zeroizing of the accumulator results in advancing the check dials a corresponding amount to set the selection mechanism.

The latter half of the clearing operation results in the disengagement of the interponent gearing so as to disconnect the accumulator and the check dials, thereby leaving the transfer value in the selection mechanism.

I claim:

1. In a calculating machine having a frame, an ordinally arranged actuating mechanism mounted in said frame, a carriage rail mounted in said frame, a carriage shiftable laterally on said carriage rail, an ordinally arranged accumulator register in said carriage, said register including in each order an accumulator dial and a drive gear, a selection mechanism in said frame including in each order a check dial and a rotatable cam assembly, a sensing means operable to sense the angular position of said assembly, power means for operating said sensing means and for differentially setting said actuating mechanism for such order as determined by the sensing means, and means for clearing said register, the combination which comprises interponent gearing including a gear slidably mounted on said rail and operative to connect an accumulator drive gear with the ordinally related check dial, and means for positioning said slidable gear in connecting or disconnecting relationship with respect to said drive gear and said check dial.

2. The apparatus of claim 1 comprising also a means for sensing a zero or nonzero condition of said selection mechanism, and means operated by said zero-sensing means for disabling said positioning means when sensing a value other than zero in said selection mechanism.

3. The apparatus of claim 1 comprising also a detent mechanism operable to engage said shiftable gear during movement from its connected to its disconnected position.

4. The apparatus of claim 1 comprising also means operated by said clearing means to position said interponent gearing in a disconnected position following operation of the clearing means.

5. In a calculating machine having a frame, an ordinally arranged and differentially positionable actuating mechanism mounted in said frame, a carriage rail mounted in said frame, a carriage shiftable laterally on said rail, an ordinally arranged accumulator register in said carriage, said register including in each order an accumulator dial and a drive gear, an ordinally arranged selection mechanism in said frame, ordinally arranged check dials operatively connected to the related order of said selection mechanism, a positionable value cam operatively connected to said check dial, a sensing means operable to sense the value position of said cam, power means for operating said sensing means and effective to differentially position the actuating mechanism in accordance with value position of said cam, and means for clearing said register, the combination which comprises interponent gearing including a gear slidably mounted on said rail and selectively positionable to connect an accumulator drive gear with the ordinally related check dial, manually operated means for positioning said slidable gear in connecting position and thereafter initiating operation of said clearing means, zero means for sensing a zero or nonzero condition of said selection mechanism, means operated by said zero-sensing means for disabling said manually operated means when sensing a value other than zero in said selection mechanism, and means operated by said clearing means for positioning said slidable gear in disconnecting position.

6. In a calculating machine having a frame, a carriage shiftable laterally on said frame, an ordinally arranged accumulator register in said carriage, said register including in each order an accumulator dial and a drive gear, a selection mechanism in said frame including in each order a differentially rotatable cam assembly, a sensing means operable to sense the angular positions of said cam assemblies, means for operating said sensing means, a differentially operable actuating means settable by said sensing means and operable to enter a value into the register in accordance with the angular positions of said cam assemblies, and means for clearing said register, normally inoperative gearing positionable to connect each cam assembly with the ordinally related accumulator gear, and means for positioning such gearing in connecting position and thereafter initiating operation of said clearing means.

7. In a calculating machine having a frame, a carriage rail mounted in said frame, a carriage shiftable laterally on said rail, an ordinally arranged accumulator register in said carriage, said register including in each order an accumulator dial and a fourteen tooth drive gear, a crawl type tens-transfer mechanism between the respective orders of said accumulator, a selection mechanism in said frame including in each order a differentially rotatable member indicative of the value selected, and means for clearing said register, the improvement which comprises connecting gearing for driving said differentially rotatable members from the ordinally related accumulator gears during clearing of the accumulator, said connecting gearing including a fourteen tooth idler constantly meshing with said drive gear, a ten tooth gear mounted on said rotatable member, an eight tooth idler constantly meshing with said last-mentioned ten tooth gear and a normally disengaged ten tooth connecting gear slidably and rotatably mounted on said rail for operatively connecting said idlers in one position of said connecting gear and disconnecting them in another position, a manually operated control means operative to position said connecting gear into connecting position and to thereafter initiate operation of said clearing means, means for holding said differentially rotatable member in its adjusted position, and means operated by said clearing means for returning said connecting gear to its disengaging position.

8. In a calculating machine having a frame, a carriage shiftable laterally on said frame; an ordinally arranged accumulator register in said carriage, said register including in each order an accumulator dial and a drive gear; a selection mechanism in said frame including in each order a check dial indicative of the value selected and a rotatable cam assembly the angular position of which controls the entry of a value into the ordinally related accumulator dial; and means for clearing said register, the improvement which comprises the combination of interposable gearing including an idler gear driven by each accumulator gear, an idler gear constantly meshing with said check dial, and an interponent gear between said idlers having a normal disconnecting position and a connecting position with respect to said idler gears; manually operated means for moving said interponent gear from its disconnecting to its connecting position; a normally inoperative detent means for said check dials; means controlled by said manually operated means for enabling said detent means; means controlled by said manually operative means for operating said clearing means subsequent to positioning of said interponent gear in connecting position; and means operated by said clearing means for returning said interponent gear to its disconnecting position.

9. In a calculating machine having a frame; a carriage shiftable laterally on said frame; an ordinally arranged accumulator register in said carriage, said register including in each order an accumulator dial and a drive gear; a selection mechanism in said frame including in each order a differentially settable selection bar and a check dial and a rotatable cam assembly set by said selection bar; actuating means mounted in said frame and operative to transmit a value into said register determined by the angular position of said cam assembly; and means for clearing said register, the combination which comprises a key, normally inoperative gearing positionable to directly connect each check dial and associated cam mechanism wtih the ordinally related accumulator gear, means operated by said key for positioning such gearing in connecting position, normally inoperative detent means operated by said key for holding a check dial in an adjusted position, means operated by said key for initiating operation of said clearing mechanism, and means operated by such clearing mechanism for returning the connecting gearing to an inoperative position.

10. The apparatus of claim 9 including also means for sensing a zero or nonzero position of said selection mechanism comprising a notch in said selection bars, a slide cooperating with said notches, projections on said slide registering with said notches when said bars are in a zero position and abutting against any bar when such bar is in any other position, and means for moving said slide upon the initial depression of said key.

11. In a calculating machine having a frame, a carriage shiftable laterally on said frame, an ordinarily arranged accumulator register in said carriage, said register including in each order a dial and a drive gear, a selection mechanism in said frame including in each order a check dial and a cam assembly set by said selection mechanism, and means for clearing said register, the improvement which comprises a back-transfer key, means operated by said key for sensing a zero or nonzero condition of the selection mechanism, and means controlled by said sensing mechanism for disabling operation of said key if a value other than zero is sensed by the sensing means, a normally inoperative detent means for holding said check dial in adjusted position, means operated by said key for enabling said detent means, a normally disengaged connecting gearing for driving said check dial from said accumulator gear, means operated by said key for positioning said normally disengaged connecting gearing into engaging position, means thereafter operated by said key for effecting operation of said clearing means, and means operated by said clearing means for returning said connecting gearing to its normal disengaged position.

References Cited in the file of this patent

UNITED STATES PATENTS

| | | |
|---|---|---|
| 1,941,309 | Koch | Dec. 26, 1933 |
| 2,121,683 | Britten, Jr. | June 21, 1938 |
| 2,305,780 | Henzelmann | Dec. 22, 1942 |
| 2,362,633 | Hilder | Nov. 14, 1944 |
| 2,399,170 | Chase | Apr. 30, 1946 |
| 2,570,456 | Karr | Oct. 9, 1951 |

FOREIGN PATENTS

| | | |
|---|---|---|
| 106,182 | Sweden | Dec. 22, 1942 |
| 218,923 | Switzerland | Sept. 1947 |
| 337,607 | Great Britain | Nov. 6, 1930 |
| 602,353 | Germany | Sept. 8, 1934 |